Oct. 3, 1939. D. V. EDWARDS 2,175,019
VITREOUS SEALING SUBSTANCE
Original Filed Dec. 19, 1935    2 Sheets-Sheet 1
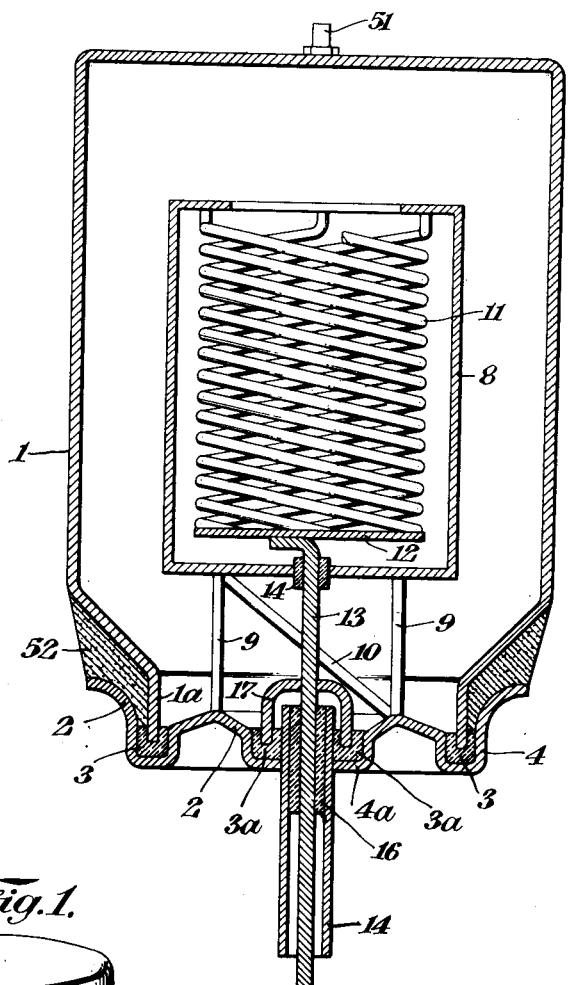
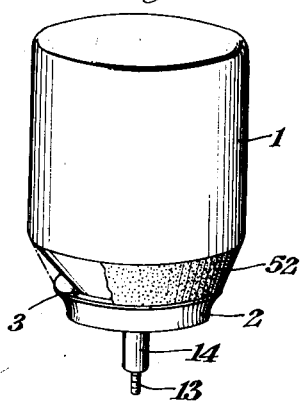
INVENTOR
Donald V. Edwards
BY
Edwards, Bower and Pool
ATTORNEYS

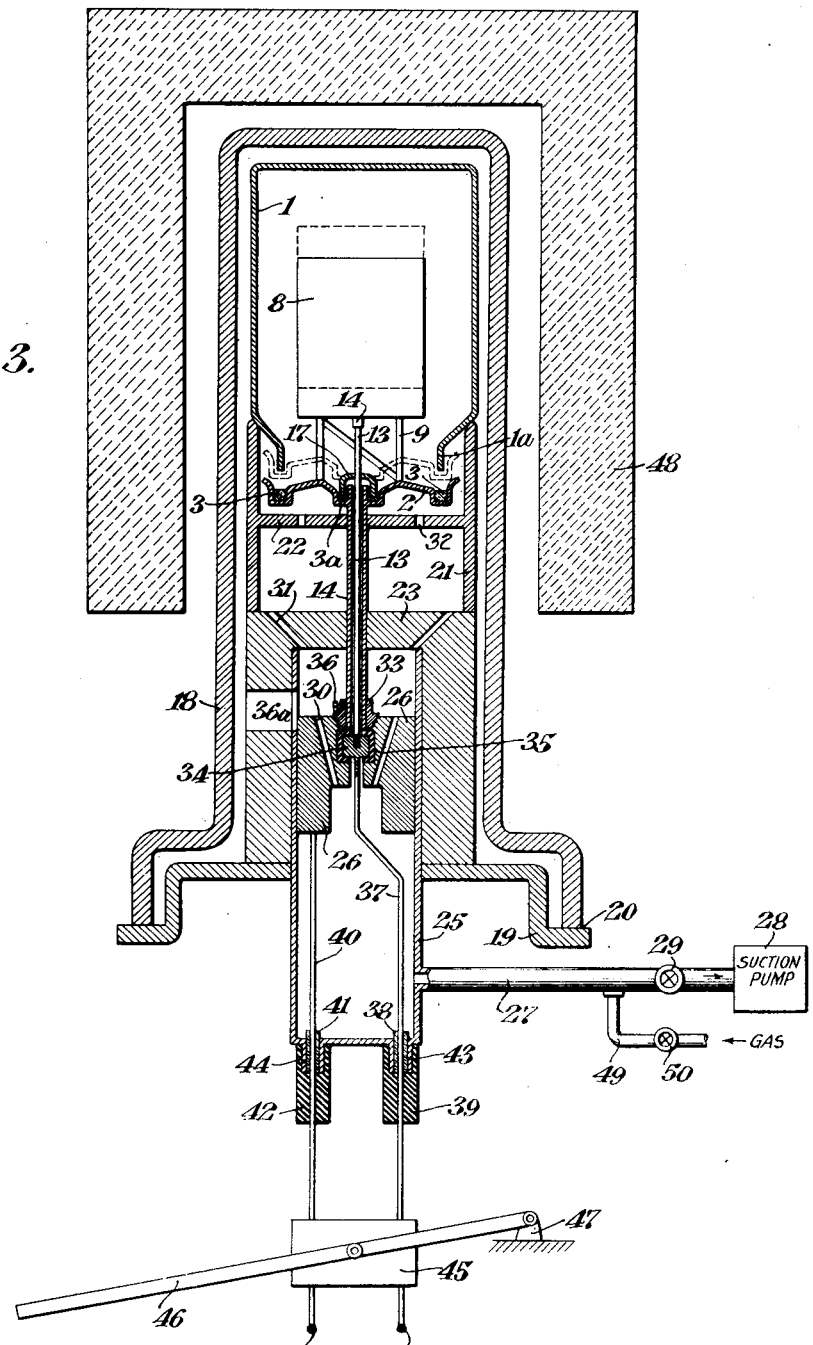

Patented Oct. 3, 1939

2,175,019

UNITED STATES PATENT OFFICE 2,175,019

VITREOUS SEALING SUBSTANCE

Donald V. Edwards, Montclair, N. J., assignor to Electrons, Inc. of Delaware, a corporation of Delaware Original application December 19, 1935, Serial No. 55,230. Divided and this application September 16, 1936, Serial No. 101,059

1 Claim. (Cl. 106—36.1)

This invention relates to vitreous substances adapted to seal together two or more pieces of metal, such as a metal cover to a container, and is particularly applicable to the sealing of metal vacuum tubes.

This application is a division of my co-pending application Serial No. 55,230, filed December 19, 1935.

The principal objects of this invention are to provide a vitreous sealing substance which is elastic and tough and doesn't froth excessively when melted under vacuum.

Heretofore in the evacuation of metal vacuum tubes it has been customary to heat the vessel while pumping the gas therefrom, but although the release of the absorbed gas from the electrodes and other parts of the tube is greatly accelerated by heating, the higher the temperature the faster the rate of release, the temperature to which it has been possible, in the past, to raise the parts has been limited by the softening of the vitreous seals which are used to seal conducting leads into the vessel. Consequently, in practice the heating temperature has been held below the softening point of the seal, with the result that an undesirably large amount of gas still remains.

In accordance with this invention it is permissible to raise the temperature considerably above the melting point of the vitreous seal while subjecting the device to a vacuum, thereby attaining a discharge device from which much more of the gas is removed than has heretofore been possible.

An ever-present problem in the art of vitreous seals is the prevention of excessive stresses which often cause the seal to crack while cooling, owing to differences in expansion of the metal and vitreous substance. This problem is met according to this invention by endowing the vitreous sealing substance with a high degree of elasticity relative to its strength so that rupturing of the seal does not occur even though the coefficients of expansion of the vitreous substance and the metal are different.

The invention will be better understood from the following detailed description of specific embodiments, together with the accompanying drawings, of which Fig. 1 is a perspective view of a discharge device having a metal base dish sealed to a metal shell by a glass seal, according to this invention, a portion of the outer seal being broken away;

Fig. 2 is a cross-section of the device shown in Fig. 1, illustrating the interior parts of the tube and the manner of sealing the tube after evacuation; and Fig. 3 illustrates a furnace and means by which the device of Figs. 1 and 2 may be exhausted and sealed.

Referring to the drawings the outer shell of the tube comprises two complementary metallic parts 1 and 2 adapted to be joined by suitable sealing material 3 which preferably insulates the parts 1 and 2 from each other. One of the parts, preferably the bottom part 2, carries the tube elements and is provided with a suitable receptacle, such as trough 4, for the sealing material. In Fig. 2 only two elements, a cathode 11 and a heat shield 8, are shown, the part 1 serving as the anode, and the device as a whole operating as a rectifier only. Obviously other elements, such as a control grid or grids may also be mounted on part 2, or the parts may be arranged on either part 1 or part 2 to suit individual conditions. In the drawings the heat shield 8 of the can type is supported on the bottom 2 by uprights 9, cross braced by brace 10, preferably welded to the support and shield. The cathode element 11 of suitable material, such as nickel, comprises one or more spirals of wire, one end of each spiral being welded to the upper end of the heat shield and the lower ends being welded to a plate 12, electrically connected to a conductor 13, insulated from the heat shield by insulation 14, and from the bottom 2 by insulation 16, whereby a heating circuit exists from conductor 13, spirals 11, heat shield 8, support 9 and bottom 2, to terminal 14 comprising an extension tube formed on bottom 2.

The cathode coils 11 may carry a suitable electron emissive coating such as barium oxide, barium nickelate, or be of the emissive character described in U. S. Patent No. 1,985,855, granted December 25, 1934, or the heater may indirectly heat an emissive can as, for example, shown in Patents No. 1,989,133 granted January 9, 1935, and No. 2,012,339 of August 27, 1935.

The conductor 13 carries a bell-shaped portion 17 adapted to be immersed in the insulating medium 3a carried in the receptacle 4a formed in the bottom 2.

It will be seen that by lowering the bottom 2, as shown in Fig. 3, the depending rim 1—a of part 1, will be raised above the insulation, thus opening the interior of the tube to the atmosphere.

The apparatus for degassing the tube comprises a suitable chamber adapted to be heated by suitable means and evacuated by a pump, the chamber being provided with suitable means for supporting the tube in opened condition, e. g., bottom lowered as shown in Fig. 3. Such a chamber is provided by the bell 18 of quartz or other material impervious to air or gas and adapted to withstand a high temperature. The bell is mounted on a base plate 19, preferably of metal, to which it may be sealed by a waxed or greased ground joint at 20. A metal cylinder 21 having a horizontal strengthening web 22 is provided for supporting the shell, as shown. The lower end of cylinder 21 rests on the head 23 of a supporting cylinder 24, preferably of quartz, which is mounted on the base plate 19. A metal cylindrical sleeve 25, closed at the lower end in a manner to retain a vacuum within the sleeve, and having a metal plug or crosshead 26 adapted to slide within it, is positioned within cylinder 24 and through the base plate 19, to which it is welded. The sleeve 25 is provided with an exhausting pipe 27 adapted to be connected with a vacuum pump 28 through a valve 29. The closed sleeve and the bell are adapted to be evacuated by the pump; and to equalize the pressure in the bell and sleeve there are provided vents 30, 31 and 32, respectively, through members 26, 23 and 22.

The tube with its bottom 2 lowered is placed on the supporting cylinder 21 and with the tube 14 protruding downwardly through centrally located openings in the web 22 and cross-head 26. The end of the tube 14 is fitted into a collar 33 threaded into the crosshead 26, and the conductor 13 is threaded into a block 34 insulated from the crosshead 26 by insulating material 35. The tube 14 is then held in place by a set screw 36, a suitable opening 36a being provided to give access through support 24 and sleeve 25 thereto.

A conductor 37 welded to block 34 passes down through a suitable insulator 38 and through a close fitting rubber hose 39, in which 38 is mounted, to the outer atmosphere, and a similar rod 40 extends down from the crosshead 26 through a similarly mounted insulator 41 and rubber hose 42. The hoses 39 and 42 are of the type known as vacuum hose; they fit tightly over the respective depending mouths 43 and 44 of the sleeve 25 integral with the base of the sleeve 25, and fit snugly around the rods 37 and 40 in a manner to permit vertical movement of the rods through the hoses without permitting the entry of gas into the sleeve 25. The outer ends of rods 37 and 40 are attached to a block 45 operable in a vertical direction by a lever 46 pivoted to a fulcrum 47 so that the rods 37 and 40 may be moved upwardly or downwardly through the vacuum hose to move the crosshead 26 in a vertical direction.

A furnace 48 is supported above the vacuum bell and adapted to be lowered over and around the part of the bell within which is located the shell and dish. Details of the furnace are not shown, but it may be of the gas or electric type, or may simply be a coil carrying a high frequency current which induces a large heating current in the shell 1 and bottom part 2, and also in the metal supporting cylinder 21.

The sealing compound should be a substance which is stable and has a temperature coefficient of expansion somewhere near or higher than that of the metal to be sealed, and should also create an elastic, tough glass or vitreous material having the property of not frothing under heat and vacuum, and not rupturing while or after cooling.

I have found that a suitable substance is provided by a mixture of silica, an oxide of iron and sodium silicate. Proportions which have been found satisfactory are as given in the following specific example:

| Compound | Proportion by weight |
| --- | --- |
| | *Percent* |
| $SiO_2$ | 28 |
| $Na_2SiO_4.5H_2O$ | 53 |
| $Fe_2O_4$ | 19 |

The proportions may be varied within reasonable limits from the above preferred proportions and still result in a glass of desired properties.

To reduce the components of the above mixture to substances which will not froth excessively when later melted under vacuum, the mixture is melted at atmospheric pressure to decompose and drive off unstable substances including water, after which it is allowed to cool and solidify. The glass made from the above mixture contains the simple oxides $Na_2O$, $SiO_2$ and $FeO$, probably partly as independent compounds and partly in combination with more complex compounds such as silicates.

It is impractical exactly to determine the compounds and their proportions in a glass, so it is customary in the glass art to identify the composition in terms of the simple oxides which would be present if the more complex compounds were all reduced to these oxides. In other words, the molecular composition of the glass is that of the aggregate of the oxides. The relative molecular proportions of these component oxides can be ascertained. Applying this oxide method of identification to the glass made from the above mixture, the simple oxide components are present in the following molecular proportions, which will vary somewhat depending on the exact proportions initially used:

| Compound | Molecular proportion |
| --- | --- |
| $Na_2O$ | 20 |
| $SiO_2$ | 60 |
| $FeO$ | 20 |

This initially treated glass is then broken up into a frit which is a convenient form for placing it in its proper place (such as the troughs of the tubes) where it is melted under the vacuum, afterward hardening to create the seal. Since the expansion coefficients of the silica ($SiO_2$) and ferrous oxide ($FeO$) are much lower than that of the metal, a substance having high temperature coefficient of expansion relative to that of silica, such as sodium ($Na_2O$) should be added in order to bring the coefficient of the resulting glass seal composition up to or above that of the metal, so that there will not be too much straining of the glass during cooling. It has been found that potassium silicate, may be used instead of the sodium silicate, although the three first mentioned substances volatilize to a greater degree than sodium silicate and are therefore not as desirable for high temperature de-gassing. It is also possible to substitute silica for most of the iron oxide. The modulus of elasticity relative to the strength of the glass thus made is so low that the glass and metal parts of the vessel may each be made heavy enough not to be fragile, and still the seal will not rupture.

To exhaust the tube it is supported as shown in Fig. 3 with the outer shell 1 resting upon the support 21 and with the extension 14 of the bottom part 2 lowered, whereby the rim of the shell 1 is above the level of the broken pieces of glass 3 and 3a in the troughs formed in the bottom portion 2, thus separating the opening between the two parts of the shell. The bell 18 is placed over the tube and sealed to the base 19. By means of the pump 28 the bell and the tube are preliminarily exhausted. The furnace 48 surrounding the bell 18 is then heated to a temperature higher than the melting point of the glass. The only real limitation on the temperature is the melting point of the metal, although it is advisable to keep the temperature below the point at which the metal evaporates rapidly. A recommended degree of degassing in the case of the steel vessel is that produced when the vacuum is pumped to about $5 \times 10^{-3}$ millimeters of mercury while the vessel and its contents are heated to about 1000° C., which is the temperature at which steel begins to evaporate rapidly. If the parts are clean about a half hour is usually required to create this degree of vacuum.

During the heating and evacuating, the filament is preferably heated by applying a voltage across the terminals of the rods 37 and 48. The pumping is continued until the cathode coating material is "converted" and all surface and dissolved gas is removed. The term "converting" means placing the cathode coating material in its ultimate condition. For example, when barium carbonate is used to coat the cathode it is "converted" when it has been changed by the heat to barium oxide, and the carbon dioxide released thereby is drawn off. During this process the glass melts to a liquid filling within the troughs 3 and 3a of the dish and is thoroughly degassed by the high temperature at the high vacuum.

When the device is adequately degassed the temperature is lowered as much as possible while still maintaining the glass liquid. The pump is then shut off by operating of valve 29. If the device is to contain a special gas filling such as argon for example, the correct amount of the gas is admitted to the vacuum chamber through a pipe 49 controlled by a valve 50. The crosshead 26 is then raised by lever 46 a distance sufficient to raise the bottom 2 until the molten glass 3 surrounds and embeds the lower edge of the part 1 but not sufficient to cause the shell to contact with the metal trough. The position of the dish and shield, as thus elevated, is shown in Fig. 3 by dotted lines. When the shell rim is dipped into the molten glass the glass wets the metal parts and seals off the inside of shell 1 from the rest of the vacuum chamber.

The heat is then turned off entirely; and as the parts cool the glass sets, forming a strong vitreous seal.

When the evacuation is completed the set screw 36 is released and by turning the tube conductor 13 will be unscrewed from the contact block 34. The tube may then be withdrawn from its support. The tube is then suitably mounted to connect conductor 13 and sleeve 14 to the heating circuit. The cathode-anode circuit is established by connecting the part 1 with conductor 13 or with tube 14. Preferably part 1 serves as the anode; a suitable anode contact is shown at 51 in Fig. 2.

If desired the annular space between the two parts 1 and 2 above the insulation 3 may be filled in with an organic sealing compound such as tar 52 to protect the glass from atmospheric moisture, and also to prevent arcing when high voltages are applied to the electrodes. In Fig. 1 this sealing compound 52 is partly broken away to show the glass seal 3.

The use of vitreous seals according to this invention is not necessarily limited to electron discharge devices. The seals might be used for any vacuum vessel.

I claim:

Means for sealing two pieces of metal comprising a glass seal adapted to adhere to both of said pieces, said glass having a composition which can be identified as having approximately the following molecular proportions:

| | |
|---|---|
| $Na_2O$ | 20 |
| $SiO_2$ | 60 |
| $FeO$ | 20 | whereby said glass is highly elastic and tough so that after being melted to form the seal it does not rupture upon cooling.

DONALD V. EDWARDS.